United States Patent [19]

Lawson et al.

[11] 4,247,328

[45] Jan. 27, 1981

[54] LITHOGRAPHIC FOUNTAIN CONCENTRATES CONTAINING A DESENSITIZING MATERIAL IN AN ORGANIC SOLVENT LIQUID

[75] Inventors: Leslie E. Lawson, Surbiton; Frank E. Smith, London, both of England

[73] Assignee: Vickers Limited, London, England

[21] Appl. No.: 3,524

[22] Filed: Jan. 15, 1979

[30] Foreign Application Priority Data

Jan. 18, 1978 [GB] United Kingdom ............... 02111/78

[51] Int. Cl.[3] .............................................. C09D 11/02

[52] U.S. Cl. ........................................................ 106/2

[58] Field of Search ............................................ 106/2

[56] References Cited

U.S. PATENT DOCUMENTS

| | | | |
|---|---|---|---|
| 3,354,824 | 11/1967 | Griffith et al. | 106/2 |
| 3,829,319 | 8/1974 | Suzuki et al. | 106/2 |
| 3,877,372 | 4/1975 | Leeds | 106/2 |
| 4,150,996 | 4/1979 | Draker et al. | 106/2 |

OTHER PUBLICATIONS

Weast (ed), Handbook of Chemistry & Physics, The Chemical Rubber Co., Cleveland, 1969, pp. 245 & 503.

*Primary Examiner*—Maurice J. Welsh
*Attorney, Agent, or Firm*—Larson, Taylor and Hinds

[57] ABSTRACT

A concentrate for dilution with water to obtain a fountain solution for lithographic printing comprises a lithographic desensitizing material dissolved in a vehicle liquid comprising an organic solvent liquid optionally in admixture with water. Preferred desensitizing materials are organo substituted ammonium salts of desensitizing acids and a preferred organic solvent liquid is isopropyl alcohol. The fountain solution obtained on dilution of the concentrate may be used with printing machines having integrated damping/inking equipment.

10 Claims, No Drawings

LITHOGRAPHIC FOUNTAIN CONCENTRATES CONTAINING A DESENSITIZING MATERIAL IN AN ORGANIC SOLVENT LIQUID

This invention relates to lithographic printing.

Printing with oleo based inks can be carried out by several processes, one of which uses a lithographic plate comprising oleophilic ink receptive image areas and hydrophilic water receptive non-image areas. In use, an aqueous medium is applied to the plate to wet selectively the non-image areas. The oleo based ink is then selectively received by the image areas and is subsequently transferred from these areas to the paper or other medium being printed. The lithographic printing process employs purpose made equipment either to transfer the oleo ink directly from the plate to the paper or other medium being printed, or to transfer it indirectly via an offset blanket. This equipment is also designed to enable the image and non-image areas to be appropriately charged with their respective oleo ink and aqueous based fluid.

When only a few copies are required it can be adequate to moisten the non-image areas with tap water or distilled water. When several thousand copies are required it is necessary to use an aqueous fountain (or dampening or fount) solution to ensure and maintain maximum water receptiveness and hence maximum ink repellancy of the non-image areas. This necessitates including in the fountain solution small quantities of materials known to lithographically desensitise the lithographic plate e.g. phosphoric, citric or tartaric acids or their salts. Fountain solutions may be acidic or alkaline and usually have a pH in the range 4 to 10.

Additionally, modern printing equipment often arranges for the fountain solution to be conveyed to the printing plate via one or more 'integrated' ink covered rollers. This requires that the fountain solution temporarily "wets" the surface of the water repellant ink, and to achieve this it is common to lower the surface tension of the fountain solution by adding an appropriate amount of one or more water miscible volatile organic solvents such as isopropyl alcohol or other alcohols. Depending upon the alcohol used, the quantity needed varies from as much as 25% by volume in the case of isopropyl alcohol to as little as 1-2% by volume in the case of higher alcohols. Other than for small offset presses (whose consumption is very low) it is impracticable from considerations of transport for supply houses to offer made-up fountain solution and it has been general for the printer to prepare the fountain solution by mixing the alcohol, desensitiser, and water as required. However, precise measurement of the weights and volumes involved is difficult to obtain in the trade where the only measuring vessel available may be a bucket, pail or jug.

According to the present invention there is provided a fountain solution concentrate for dilution with water to form a fountain solution for use when lithographic printing, which concentrate comprises a lithographic desensitising material in solution in a liquid vehicle comprising at least 50% by volume of a water soluble organic solvent liquid and from 0 to 50% by volume of water.

It is not necessary to admix, with the concentrate of the invention, anything other than water in order to obtain the desired fountain solution. The concentrate of the present invention may simply be diluted with tap water to form a fountain solution suitable for example for use with integrated damping/inking equipment.

The lithographic desensitising material may be an acid, such as phosphoric acid, citric acid, tartaric acid or ethylene diamine tetraacetic acid or salts or other derivatives of such acids. It is particularly preferred to use an organo substituted-ammonium salt of such an acid as lithographic desensitising material. The use of salts as desensitising material is preferred since they act as a buffer and overcome the effects of the use of acid or alkaline tap-waters. Preferred salts are triethylammonium phosphate, triethylammonium dihydrogen phosphate, tripropyl ammonium dihydrogen phosphate, dimethylammonium dihydrogen phosphate, butyl acid phosphate and trisodium citrate. Mixtures of acids, mixtures of salts and acid/salt mixtures may be used as the lithographic desensitising material.

The lithographic desensitising material may be soluble in the solvent alone or in a mixture of the solvent and water. In the latter case, it is preferred for the water content of the concentrate to be as low as possible; for example, the water content should preferably be not more than about 20% by volume. On the other hand, the concentrate should not contain such a high concentration of desensitising material or organic solvent that the dilution of the same to produce the desired fountain solution necessitates having to accurately measure out a very small volume of concentrate for admixture with a large volume of water.

Preferably the liquid vehicle is a homogeneous liquid and it is preferred for the organic solvent to be an alcohol. A particularly preferred alcohol is isopropyl alcohol optionally in admixture with other alcohols such as isobutyl alcohol or 2-ethoxyethanol. Specific examples of liquid vehicles suitable for use with triethylammonium phosphate as desensitising material are ethylene glycol; propylene glycol; glycerol; hexylene glycol; a mixture of 85 parts by volume N-methyl-2-pyrrolidone and 15 parts by volume water; a mixture of 75 parts by volume 2-methoxy ethyl acetate and 25 parts by volume water; 2-(2-ethoxyethoxy ethanol); 1,3-butane diol; and 2-(2-butoxyethoxy)-ethanol. Examples of liquid vehicles suitable for use with butyl acid phosphate as desensitising material are 2-(2-butoxyethoxy)-ethanol; polyethylene glycol; a mixture of equal parts by volume of water and glycerol; 2-(2-ethoxy ethoxy)-ethanol and propylene glycol. Examples of liquid vehicles suitable for use with citric acid as desensitising material are 2-ethoxy ethanol and 2-(2-methoxyethoxy)-ethanol. Examples of liquid vehicles suitable for use with phosphoric acid as desensitising material are 2-methoxy methyl acetate; gamma-butyrolactone; and N-methyl-2-pyrrolidone.

The amount of lithographic desensitising material present in the concentrate may vary between very wide limits depending upon the nature of the desensitising material and the intended degree of dilution of the concentrate before use. Essentially, the concentrate will contain an amount of desensitising material such that, on dilution of the concentrate to produce a fountain solution having an organic solvent content adequate to lower the surface tension to the required value, the fountain solution contains sufficient desensitising material to maintain the hydrophilic oleophobic character of the non-image areas of the lithographic plate. Such will be readily determinable by the person skilled in the art. As a rough guide, however, the concentrate may contain from about 2.0 to about 200 grams lithographic desensitising material per liter of organic solvent liquid.

The concentrate may include additional materials such as surfactants, colorants, thickeners, anti-bacterial agents and other substances which do not materially affect the desensitising characteristics of the concentrate or the properties of the fountain solutions prepared therefrom.

One specific example of a suitable concentrate in accordance with the invention is a mixture of 99.5 ml isopropyl alcohol and 0.5% ml (about 0.85 g) phosphoric acid (85%). This concentrate may be diluted with clean water to give a 20% by volume concentration of alcohol in approximately 80% water. Another specific example of a concentrate in accordance with the invention is a mixture of 92.0 ml isopropyl alcohol, 7.7 ml 2-ethoxyethanol, 0.1 ml Antarox CO530 (GAF) (surfactant) and 0.2 ml (about 0.34 g) phosphoric acid (85%).

As mentioned above these simplified examples of concentrates are not always adequate when used in conjunction with certain tap waters due to resultant unduly high or low pH values of the working solutions. However, in accordance with a preferred aspect of this invention, some or all of the free acid present is neutralised by the addition of a suitable base to form a solvent soluble compound which is also a pH buffer. Whereas this can be achieved in a liquid vehicle virtually devoid of water, there is no reason why an appropriate quantity of water cannot be added if required to obtain solution.

The following Examples illustrate the invention.

EXAMPLE 1

A fountain solution concentrate containing the following materials was made up:

| | |
|---|---|
| Isopropyl alcohol | 600 ml |
| isobutyl alcohol | 150 ml |
| water | 10 ml |
| triethylammonium phosphate | 20 g |

The triethylammonium phosphate used was substantially neutral and corresponded to $(Et_3N)_{1.5}H_{1.5}PO_4$. The above concentrate was used to charge an automatic dispensing device which was set to meter and maintain a 6% alcohol concentration in the working solution supplied to a damping unit on a large multiunit sheet fed offset printing press. This press then printed 60,000 good copies without requiring any further addition to the damping fluid.

EXAMPLE 2

A fountain concentrate was made comprising:

| | |
|---|---|
| tetrahydrofurfuryl alcohol: | 950 ml |
| triethylammonium phosphate (as in Example 1) | 50 g |

This was diluted with tap water to form a 2% solution, and used without further additions as the damping fluid on a Heidelberg KORD printing press fitted with an imaged negative working presensitised plate (Marathon) supplied by Vickers Limited. A run of 17,000 good copies was made without difficulty.

EXAMPLE 3

Two fountain concentrates were made and used successfully in the manner of the preceding Example, excepting that the tetrahydrofurfuryl alcohol was substituted with (a) furfuryl alcohol (b) diacetone alcohol

EXAMPLE 4

An alcohol-water fountain concentrate was made containing:

530 ml isopropyl alcohol, 200 ml water, and 270 ml of a solution of triethylammonium dihydrogen phosphate in a mixture of 72.3% by volume isopropanol and 27.7% by volume water, the final solution containing a total of 81 g/l of said phosphate (expressed as $H_3PO_4$). This concentrate was diluted with 5 liters of tap water and found to possess a pH of 5.3. It was used on a lithographic press whilst printing from a positive working presensitised plate (Alympic) to obtain 20,000 satisfactory copies without difficulty.

EXAMPLE 5

A fountain solution concentrate comprising 600 ml isopropyl alcohol and 400 ml of a solution of tripropylammonium dihydrogen phosphate in isopropanol with a final concentration of 40 g/l of said phosphate (expressed as $H_3PO_4$) was made up and used in the manner of Example 4 after diluting with 9 liters of water. No trouble was experienced whilst obtaining good, clean, well defined copies. The pH of the diluted solution was 4.3.

EXAMPLE 6

Example 5 was repeated using a solution of tributyl ammonium dihydrogen phosphate in isopropanol the final concentration of said phosphate (expressed as $H_3PO_4$) being 100 g/l before dilution. The working pH was 5.1. No difficulties were experienced.

EXAMPLE 7

A solution of 200 grams of dimethylammonium dihydrogen phosphate in 800 ml of 1:1 by volume mixture of isopropanol and water and containing a total of 59 g/l of said phosphate (expressed as $H_3PO_4$) was diluted with 3 liters of tap water. The pH of the resultant solution was 3.3. This solution was used on a Solna sheet fed offset printing press in conjunction with a deep-etch aluminium plate to obtain 30,000 good copies without difficulty.

EXAMPLE 8

To a mixture of 500 ml of 2-ethoxyethanol and 500 ml of water, was added 10 ml of ethanolamine and 10 ml (about 17 g) of phosphoric acid (85%). When this concentrate was diluted with about 25 liters of tap water a fountain solution of pH of 5.9 was obtained. This was used successfully in the manner of Example 4.

EXAMPLE 9

A fountain concentrate containing 1 liter of isopropyl alcohol, 50 g of butyl acid phosphate and 20 g of ethanolamine was diluted with 20 liters of tap water to obtain a fountain solution of pH 7.0 It was found to damp well and maintain high quality printing without the need for the addition of further materials.

The butyl acid phosphate used had an acid number of 475 and contained approximately 50% butyl dihydrogen and 50% dibutyl hydrogen phosphate.

EXAMPLE 10

A fountain concentrate was made comprising 6.0 liters of isopropyl alcohol, 4.0 liters of demineralised water, and 40 grams of tri-sodium citrate 5 $H_2O$. This solution was diluted with 70 liters of tap water and used successfully as in Example 4.

EXAMPLE 11

10 g of "amine alginate" obtained from Alginate Industries Ltd and believed to be the ethanolamine salt of alginic acid was dissolved in a mixture of 900 ml isopropyl alcohol and 100 ml water. The resultant fountain concentrate was added to 9 liters of water to give a satisfactory alcoholic fountain solution.

We claim:

1. A fountain solution concentrate for dilution with water to form a fountain solution for use in lithographic printing, which concentrate consists essentially of lithographic desensitising material in solution in a liquid vehicle comprising at least 50% by volume of a water soluble organic solvent liquid and from 0 to 50% by volume of water, the lithographic desensitising material being selected from the group consisting of trisodium citrate, butyl acid phosphate, alkyl group substituted ammonium salts of acids, ethanolamine salts of phosphoric acid, ethanolamine salts of alginic acid, ethylene diamine tetra-acetic acid, and salts of ethylene diamine tetra-acetic acid.

2. A concentrate as claimed in claim 1 wherein the desensitising material is selected from the group consisting of triethyl ammonium phosphate, triethyl ammonium dihydrogen phosphate, tripropyl ammonium phosphate and dimethyl ammonium dihydrogen phosphate.

3. A concentrate as claimed in claim 1 wherein the organic solvent liquid is isopropyl alcohol.

4. A concentrate as claimed in claim 1 wherein the organic solvent liquid is selected from the group consisting of tetrahydrofurfuryl alcohol, furfuryl alcohol, diacetone alcohol, a mixture of isopropyl alcohol and isobutyl alcohol, and a mixture of isopropyl alcohol and 2-ethoxy ethanol.

5. A concentrate as claimed in claim 1 wherein the liquid vehicle is selected from the group consisting of ethylene glycol; glycerol; hexylene glycol; a mixture of N-methyl-2-pyrrolidone and water; a mixture of 2-methoxy ethyl acetate and water; 2-(2-ethoxy ethoxy)-ethanol; 1,3-butanediol; 2-(2-butoxy ethoxy)-ethanol; polyethylene glycol; a mixture of water and glycerol; propylene glycol; 2-ethoxyethanol; 2-(2-methoxyethoxy)-ethanol and gamma-butyrolactone.

6. A concentrate as claimed in claim 1 wherein the lithographic desensitising material is present in an amount of from 2.0 to 200 grams per liter of organic solvent liquid.

7. A fountain solution concentrate for dilution with water to form a fountain solution for use in lithographic printing, which concentrate is a solution of:

(i) a lithographic desensitising material selected from the group consisting of triethyl ammonium phosphate, triethyl ammonium dihydrogen phosphate, tripropyl ammonium phosphate, dimethyl ammonium dihydrogen phosphate, trisodium citrate and butyl acid phosphate, in (ii) a liquid vehicle comprising at least 50% by volume of a water soluble organic solvent liquid and from 0 to 50% by volume of water, the organic solvent liquid being selected from the group consisting of isopropyl alcohol, a mixture of isopropyl alcohol and isobutyl alcohol, a mixture of isopropyl alcohol and 2-ethoxy ethanol, tetrahydrofurfuryl alcohol, furfuryl alcohol, diacetone alcohol, ethylene glycol, glycerol, hexylene glycol, N-methyl-2-pyrrolidone, 2-methoxyethyl acetate, 2-(2-ethoxy ethoxy)-ethanol, 1,3-butanediol, 2-(2-butoxy ethoxy)-ethanol, polyethylene glycol, propylene glycol, 2-ethoxyethanol, 2-(2-methoxyethoxy)-ethanol and gamma-butyrolactone, the lithographic desensitising material being present in an amount of from 2.0 to 200 grams per liter of organic solvent liquid.

8. A method of producing a fountain solution for use in lithographic printing which comprises diluting with water the concentrate of claim 1.

9. A fountain solution whenever obtained by the method of claim 8.

10. A method of lithographic printing which comprises wetting a lithographic printing plate having image areas and non-image areas with a fountain solution as claimed in claim 9 so that the solution is selectively retained on the non-image areas, applying an oleo ink to the wetted plate so that the ink is selectively received by the image areas, and transferring the ink from the image areas onto the medium to be printed.

* * * * *